United States Patent [19]
Laurin et al.

[11] Patent Number: 6,117,384
[45] Date of Patent: Sep. 12, 2000

[54] IN-MOLD DECORATING PROCESS

[75] Inventors: Michael N. Laurin; Brian A. Nourse, both of Pittsfield; David P. Reis, Lenox, all of Mass.; Karen D. Riding, Castleton, N.Y.; Blair Souder, Dalton; Gary A. Soutier, Pittsfield, both of Mass.

[73] Assignee: General Electric Co., Schenectady, N.Y.

[21] Appl. No.: 08/965,675

[22] Filed: Nov. 6, 1997

[51] Int. Cl.⁷ ........................................................ B28B 3/06
[52] U.S. Cl. ........................ 264/297.2; 264/261; 264/259; 264/266; 264/247; 264/267; 264/209.8; 156/244.11; 156/245; 156/244.27; 156/244.25
[58] Field of Search ..................................... 264/259, 266, 264/257, 132, 247, 258, 261, 267; 156/277, 246.11, 244.25, 244.27, 245

[56] References Cited

U.S. PATENT DOCUMENTS

| | | |
|---|---|---|
| 3,402,004 | 9/1968 | Warhol . |
| 3,713,936 | 1/1973 | Ramsay . |
| 4,276,346 | 6/1981 | Bramwell . |
| 4,579,764 | 4/1986 | Peoples, Jr. et al. . |
| 4,744,848 | 5/1988 | Andrews et al. . |
| 4,800,468 | 1/1989 | Yokoyama . |
| 4,873,045 | 10/1989 | Fujita et al. ............................. 264/259 |
| 4,898,706 | 2/1990 | Yabe et al. ............................... 264/266 |
| 4,917,927 | 4/1990 | Sakaitani et al. . |
| 4,961,894 | 10/1990 | Yabe et al. . |
| 5,001,610 | 3/1991 | Otaka . |
| 5,151,237 | 9/1992 | Hettinga . |
| 5,227,222 | 7/1993 | Ogawa et al. . |
| 5,264,172 | 11/1993 | Rosica et al. . |
| 5,275,764 | 1/1994 | Hettinga . |
| 5,304,413 | 4/1994 | Bloom et al. . |

FOREIGN PATENT DOCUMENTS

| | | |
|---|---|---|
| 311079 | 4/1989 | European Pat. Off. . |
| 448249 | 9/1991 | European Pat. Off. . |
| 502672 | 3/1992 | European Pat. Off. . |
| 481119 | 4/1992 | European Pat. Off. . |
| 311079 | 3/1993 | European Pat. Off. . |
| 299509 | 6/1994 | European Pat. Off. . |
| 619171 | 10/1994 | European Pat. Off. . |
| 644028 | 3/1995 | European Pat. Off. . |
| 0 691 201 A2 | 1/1996 | European Pat. Off. . |
| 694377 | 1/1996 | European Pat. Off. . |
| 4015125 | 11/1991 | Germany . |
| 41 31 223 | 3/1992 | Germany . |
| 297 17 698 U | 11/1997 | Germany . |
| 60-201935 | 10/1985 | Japan . |
| 60-203607 | 10/1985 | Japan . |
| 63-056418A | 3/1988 | Japan . |
| 63-118219 | 5/1988 | Japan . |
| 63-120615 | 5/1988 | Japan . |
| 63-135214 | 6/1988 | Japan . |
| 63-178016 | 7/1988 | Japan . |
| 01237134 | 9/1989 | Japan . |
| 92021588 | 4/1992 | Japan . |
| 4201312 | 7/1992 | Japan . |
| 05131489 | 5/1993 | Japan . |
| 05131490 | 5/1993 | Japan . |
| 05131493 | 5/1993 | Japan . |
| 5-169488 | 7/1993 | Japan . |
| 07156191 | 6/1995 | Japan . |
| 9-106704A | 4/1997 | Japan . |
| 2092511 | 8/1982 | United Kingdom . |
| 22611878 | 5/1993 | United Kingdom . |
| 2281529 | 3/1995 | United Kingdom . |
| WO09403337 | 2/1994 | WIPO . |
| WO9423925 | 10/1994 | WIPO . |
| WO 98 09790 | 3/1998 | WIPO . |

OTHER PUBLICATIONS

GE Plastics Structured Products Brochure: "In–Mold Films: A Guide for Designing, Forming, and Molding with Screen-printed Lexan® Films", dated Feb. 1997.

*Primary Examiner*—Merrick Dixon

[57] ABSTRACT

An improved process for the manufacture of plastic articles such as light assemblies, and the articles made by said process, are disclosed. The disclosed process includes a step wherein one or more colors are decorated onto a single film which is then incorporated with other components in an in-mold decorating process to yield the improved articles of the invention.

18 Claims, No Drawings

IN-MOLD DECORATING PROCESS

The present invention relates to the manufacture of plastic articles and, more particularly, to an improved in-mold decorating process for the manufacture of such articles. The disclosed process is particularly well suited for the manufacture of automotive light assemblies wherein one or more colors are screen printed onto a single film which is then incorporated with other components in an in-mold decorating process.

FIELD OF THE INVENTION

The present invention relates to an improved in-mold decorating process and product which is particularly well suited for the preparation of automobile light assemblies.

In a typical in-mold decorating process, a printed substrate is formed into a three-dimensional shape and placed into a mold. Molten resin is then injected into the mold cavity space behind the formed substrate, forming a single molded part. The process is particularly appropriate for parts that are not particularly complicated. However, the process must be modified in order to produce parts such as tail lights, which usually require multiple colored and/or reflective elements.

Applicants have disclosed herein an improved in-mold decorating process which greatly simplifies the manufacture of complicated parts. In the case of, for example, a tail light assembly, the disclosed process is not only simpler but also produces one-piece products that are superior to the multi-component tail light assemblies which are presently available.

BACKGROUND OF THE INVENTION

To date, automotive tail lights and similar products have been produced using complicated and/or costly manufacturing procedures. This high degree of complexity has been necessitated by the complexity of such parts, which have typically incorporated several different components within a frame. For example, a standard tail light usually includes clear lenses, colored lenses, reflective parts, etc. These separate pieces were arranged in the appropriate order and bound together within a frame which was then attached to the automobile.

Another approach has been to mold a first part of the lens in one tool and to then transfer this first molded part to a second injection molding machine having a second tool. The first molded part is inserted into the second machine and a new color may be injected onto the first part to create a two color lens. The process may be repeated as many times as necessary to produce the desired tail light assembly. Obviously, this approach is costly since it requires at least two injection molding machines and at least two tools.

Alternatively, multi-shot injection molding machines have been used. Multi-shot is a process using more than one injection barrel to obtain a multi-colored part. This process is very expensive, as it requires specially designed injection barrels and tools. In a typical application, a clear coating might be initially injected onto the three-dimensional piece, and then various colored or reflective segments would be injected, using different injection barrels, onto the base piece in the appropriate order. While an advance over the framing of individual pieces, there are a number of shortcomings associated with multi-shot injection, including the previously discussed increased tooling costs, longer processing cycle times, additional part scrap and the need to maintain additional material inventory.

More recently, an in-mold processing variation of the framing technique has been proposed in U.S. Pat. No. 5,275,764. The '764 patent suggests that one or more colored or reflective elements be placed into a single mold cavity. Molten plastic is then injected into the mold cavity such that the individual colored or reflective elements are combined in a one-piece assembly having one or more colors or reflective means in a single lens panel. It is claimed that since the elements may be of uniform thickness and density, this one-piece assembly provides more even color distribution when lit. In addition, this one-piece assembly is said to reduce cost and manufacturing time in comparison to the tail lights of the prior art.

SUMMARY OF THE INVENTION

The present invention is directed to an improved method for manufacturing automobile light assemblies or similar structures which comprises the steps of:

(1) providing a substrate made, for example, of polycarbonate;

(2) optionally co-extruding with the substrate (or laminating thereto) a weatherable fluoropolymer film;

(3) screen printing and/or otherwise decorating one or more colors on a surface of said substrate;

(4) forming and trimming the printed substrate into a three-dimensional shape, such as that of an automobile tail light;

(5) fitting the printed substrate into a mold having a surface which matches the three-dimensional shape of the substrate; and (6) injecting a molten resin, such as polycarbonate, into the mold cavity through a plurality of gates behind the printed substrate to produce a one-piece, permanently bonded three-dimensional product suitable for applications, e.g., automotive tail lights.

The present invention is also directed to the tail light or similar structure made by said process. In the case of a multi-color tail light made in accordance with the present invention, said tail light may vary broadly in design and style, but preferably comprises four discreet layers. In order from the exposed exterior surface to the interior surface closest to the light source, those layers are:

(1) a polycarbonate film layer or other transparent substrate, to which the PVDF film is laminated;

(2) optionally, a layer of polyvinylidene fluoride ("PVDF") film or other material resistant to ultraviolet (UV) light;

(3) a decorated layer, which may be varied as desired, and which is printed on the exposed surface of the polycarbonate layer; and (4) a polycarbonate substrate or other substrate with suitable bond strength which is injection molded directly against the decorated layer.

The disclosed process eliminates the need for the framing of individual parts and the multi-shot injection techniques of the prior art. In turn, the present process beneficially reduces the tooling costs, processing cycle times, part scrap and material inventory of these prior art methods. Moreover, design changes or modifications may be made simply and cost effectively with the present process, because such changes or modifications, when necessary, may be made to the screen printing rather than the injection molding or tooling equipment.

DETAILED DESCRIPTION OF THE INVENTION

One of the most efficient and cost-effective ways of decorating a part is to do it during the molding cycle. One way to accomplish this is by inserting a decorated substrate into the cavity of a molding tool and injecting plastic behind it. This process is generally known as in-mold decoration or insert mold decoration (IMD). The decoration for the finished part can either be exposed to the environment ("first surface decoration") and/or encapsulated between the substrate and the injected material ("second surface decoration"). In-mold decoration can provide a number of advantages over other decoration methods:

- In-molded graphics can provide product differentiation for consumer applications.
- Parts can be decorated then molded in one operation.
- Graphics can be changed even while using the same injection molding tool.
- Complex 3D parts can be decorated.
- Processing and labor costs can be reduced.
- Secondary operations such as adhesives may be eliminated.
- The in-molded film remains in place for the life of the part.

In order to optimize any in-mold decorating process, a number of prerequisites should be considered:

- Selecting the proper substrate (e.g., LEXAN® polycarbonate) and film thickness.
- Determining which surface will be decorated.
- For a 3D part, access to vacuum forming or cold forming expertise.
- Decorating with the part aesthetics and gating system in mind.
- Selecting compatible film/resin/ink combinations.

While a significant advance over prior techniques, there are a number of drawbacks with in-mold decoration. An obvious drawback to first surface decoration is that the decoration is exposed to the environment, and therefore susceptible to wear. Of course, this problem is eliminated with second surface decorated parts, where the decoration is encapsulated between protective inner and outer surfaces.

That is not to say that second surface decoration is without problems. In fact, at least two problems have been recognized, and both are adhesion related. The first problem is wash out, i.e., the adhesion between decoration and substrate may be lost or diminished when the injected material contacts the ink. Wash out causes graphic distortion. To combat this, it has been suggested that the decoration be sandwiched between two substrates so that it is protected from both the environment and the injected material. Obviously, since a second substrate layer adds complexity to the process and cost to the part, this suggestion is not practical.

When the injection process is modified to minimize wash out, the second problem arises, i.e., a loss of adhesion between the injected material and the decorated substrate. One proposed solution to this problem has been to limit the use of decoration to areas away from the gate area of the injection molded part, i.e., the area where the injected material is introduced into the mold. The primary problem with this method is that it severely limits the potential decorations. Previous attempts to solve the first problem have generally aggravated the second problem, and vice versa.

The present process provides a simultaneous solution to the two most common problems associated with second surface in-mold decoration. The superior second surface IMD parts of the present invention are obtained by the following general method:

(1) start with a smooth, transparent substrate;
(2) print graphics onto the second surface of the substrate;
(3) form the printed substrate if geometry dictates (flat parts generally do not require forming);
(4) provide a mold that has one surface that matches the shape of the formed substrate or dimensions of the unformed substrate;
(5) trim the substrate so that it fits inside the injection mold;
(6) place the decorated, formed, trimmed substrate between the two halves of the mold;
(7) close the mold and inject a material against the decoration on the second surface of the substrate.

The disclosed process produces one-piece injection molded parts having a permanently bonded printed applique wherein the graphics are sandwiched between the substrate and the injected material. Such parts overcome the aforementioned problems associated with second surface decoration.

In their extensive investigations to determine and resolve prior shortcomings of second surface decoration, the present inventors additionally determined that a number of other parameters contribute the preparation of the superior second surface decorated parts of this invention.

First, high temperature, formable inks are preferably used for the graphics. Second surface decoration requires more robust ink systems to provide adequate ink adhesion during the molding process. Moreover, in applications such as light assemblies where light transmission is critical, dye inks should be used rather than pigmented inks so as not to affect light transmission and haze readings. Evaluation of many different inks indicates that many ink systems are not suitable for second surface decorating. Among those inks which are appropriate are the following:

Naz-dar 9600
Colonial/Coates C-37 Series
Marabuwerke IMD Spezialfarbe 3060
Nor-cote (UK) IMD Series Prototype molds may be constructed from common materials such as plaster, hard woods, fiberglass, syntactic foam and silicone. These materials are relatively easy to work with and allow minor modifications. It is common practice for designers eager to experiment with IMD to cast a silicone forming mold off an existing injection mold. It must be noted that this practice is suitable for determining initial feasibility, but formed film samples will not accurately fit the mold cavity due to the combination of material shrinkage and expansion of the casting material. This often causes a poor fit in the cavity, especially in complex three dimensional parts, and could lead to poor appearance of the in-mold decorated part. In order to obtain properly fitting film inserts for an existing injection tool, creating the forming prototype mold from the tool drawings of the injection mold is suggested. After establishing feasibility, it is suggested that new forming and injection tools be built which are designed specifically for IMD. For example, production forming tools for use on LEXAN® polycarbonate should be constructed of durable materials such as cast or machined aluminum, steel or metal tilled epoxy. Conductive molds should be internally heated to a temperature of 250° F.

The formed part will contract in size once it is removed from the mold and allowed to cool. The amount of shrinkage depends on the material selected, but it is predictable and must be accounted for when calculating the mold dimensions. The same is true for the expansion of the mold at operating temperatures. For example, LEXAN® polycarbonate film will typically shrink approximately 0.5–0.9% after forming, depending on the mold. The thermal expansion properties of the mold material at an operating temperature of 250° F. must be subtracted from the film shrinkage number to obtain accurate mold dimensions. In addition, draft angles of 5 to 7 degrees are suggested to facilitate part removal from male molds. Female molds require less draft (1 to 2 degrees).

The basic considerations in gating are part design, flow, end use requirements and location of in-mold graphics. The standard guidelines of traditional gating apply to IMD along with several extra considerations. For example, one gate should be used whenever possible to minimize the potential for wrinkling the film. Gates should be located away from end-use impact as well as to provide flow from thick to thin sections to minimize weld lines. Gates should also be located at right angles to the runner to minimize jetting, splay and gate blush. Large parts requiring multiple gates should include gate positions close enough together to reduce pressure loss. Sequential gating may be used to prevent folding of the film at weld lines. Gate land lengths should be kept as short as possible. An impinging gate may be used to ensure that the incoming flow is directed against the cavity wall or core to prevent jetting. Venting (particularly full perimeter venting) may be accomplished by knock outs, cores and parting lines and should be used whenever possible to avoid trapped gas that can burn and rupture the film. In addition, flow restrictions near gate areas can increase the potential for wash out due to increased shear. If bosses, core shutoffs, etc., are needed near a gate, rounded features or corners should be used to reduce shear. Finally, care should also be taken to ensure that the gating distributes the injection pressure over a large area, thus reducing the shear forces at the gate. Examples of gates that accomplish this include fan gates and submarine gates that enter the part via a rib.

When selecting a resin, it is advantageous that the resin's viscosity be sufficiently low such that the pressure necessary to inject it into the mold may be reduced. In addition, the injection may be profiled so that the viscosity of the injected material maintained at a sufficiently low level in the gate area and may be raised after a suitable skin layer is established near the gate. At lower viscosity, the shear force of the injected material is lower and is therefore less likely to disturb the ink on the second surface of the substrate. When using a LEXAN® polycarbonate substrate, it has been found that substrate/resin adhesion is acceptable when the resin is either a polycarbonate (e.g., LEXAN®) or polycarbonate-containing (e.g., CYCOLOY®, XENOY®, VALOX®) resin.

It is also possible to print the graphics on the substrate so that they extend beyond the gating area and into the runner system. In this case, if the ink is disturbed by the flow of the injected material, it will be disturbed in the runner area that will be trimmed off after the part is ejected from the mold.

Of course, runnerless systems or heated gating systems may also be employed. With a runnerless system, the drop diameter must be large enough to sufficiently distribute the pressure or flow into a part, such as a rib, which does. With a heated gating system, the tips of the heated gates be maintained at a temperature sufficiently below the softening temperature of the substrate so as to prevent substrate deformation.

Screenprinting is an example of a suitable technique for producing graphics on the film substrates of the present invention. Screenprinting is essentially a stencil printing process which may now be generated by computer with the aid of various software packages. Its ability to vary and control ink thickness accurately has made it an extremely useful process for the decoration of many different types of plastic substrates.

In screenprinting, a screen or stencil is prepared and bonded to a fine weave fabric which is then tensioned in a rigid frame. Frames may be made of either wood or metal, with metal being preferred. The frame must be dimensionally stable and able to withstand handling during the printing process. Screen fabrics are generally made from metallized polyester, nylon, stainless steel, and most commonly, polyester. The fabric is tightly woven under precise control using dimensionally exact filaments. There are a number of variables that affect ink deposit, including thread diameter, squeegee angle and hardness, emulsion thickness, etc. Higher mesh screens are suggested for formed IMD applications.

The basic screenprinting process involves the use of a flat bed where the substrate is held by vacuum during printing. A frame holder positions the screen and holds it both vertically and horizontally during the printing process. With the screen lowered over the substrate bed and held at the off contact distance by the press, the squeegee carrier moves the blade across the screen at a preset speed, pressure, stroke and angle.

It is important to register artwork during a screenprinting operation. This is normally done by locking the frame into a holder that aligns the frame using pins or holders. The pin alignment method is generally preferred because the artwork can be aligned along with the screen frame. Alignment of the substrate with the print image is done through the use of edge guides, mechanical stops or automatic devices. The first color is aligned by this method and subsequent colors are aligned through the use of targets or gauge marks which are printed along side the artwork.

Once the ink is printed, it must be either dried or cured depending on the ink technology used. If the ink is solvent or water based, then a gas fired or electric dryer can be used to dry the ink. When printing on plastic films, it is important to control the temperature and dwell time in the oven to avoid distorting the film. If a solvent ink is used, it is important to use an oven with good air flow to dissipate the fumes. It is also possible to use an infrared dryer on some ink types, but particular attention must be paid to the temperature control of the system. If the ink is UV curable, many suitable commercial units are available for curing such reactive ink types.

If the final piece is three dimensional, there are two basic techniques for forming 3D IMD parts. For parts having a draw depth greater than ½ inch, thermoforining is suggested. For parts containing detailed alphanumeric graphics or draw depths less than ½ inch, cold forming is preferred.

The foregoing description merely explains the invention and the invention is not limited thereto, as those skilled in the art having the disclosure before them will be able to make modifications and variations therein without departing from the scope of the invention. Moreover, the various parameters discussed herein may be adjusted by those of skill in the art in order to maximize results. By way of example, a second surface decorated part in accordance with the present invention was molded in a hot manifold system using a LEXAN® polycarbonate substrate, a solvent based ink, and LEXAN® 1 resin. The resulting part had approximately 0.1 inch of washout at the gate when a melt temperature of 510° F. was used. By switching the resin to CYCOLOY® C2950HF and the melt temperature to 450°

F., washout was eliminated. Wash out may also be eliminated by varying the process parameters. For example, no wash out was observed in another part molded from CYCOLOY® C2950HF resin when the resin was initially injected at only 5% of the injection molding machine's speed capacity until the area around the gates was filled. Thereafter, injection was carried out at 50–100% of the machine's injection speed capacity. It will be appreciated by those of skill in the art that this process variation reduces the shear in the area near the gates, i.e., the area where wash out initiates.

What is claimed is:

1. An improved second surface in-mold decorating process of encapsulating a decorated surface between an outer and an inner surface comprising the steps of:
   (1) providing a transparent substrate;
   (2) decorating one or more inks on one surface of said substrate;
   (3) forming the decorated substrate into a three-dimensional shape;
   (4) fitting the decorated substrate into a mold cavity having a surface which matches the three-dimensional shape of the substrate and wherein the surface of the substrate opposite the decorated surface is in contact with the mold cavity surface; and
   (5) injecting a molten resin into the mold cavity through one or more gates behind the decorated substrate and directly against the ink decorated surface of the substrate to produce a one-piece, permanently bonded three-dimensional piece.

2. A process according to claim 1 wherein a weatherable fluoropolymer film is co-extruded with said transparent substrate or laminating to said transparent substrate wherein the fluoropolymer film is in contact with the surface opposite the decorated surface.

3. A process according to claim 2 wherein said fluoropolymer film is selected from the group consisting of polyvinyl fluorides and polyvinylidene fluorides.

4. A process according to claim 1 wherein said transparent substrate is a polycarbonate.

5. A process according to claim 1 wherein said decorating step is done by screenprinting.

6. A process according to claim 1 wherein said inks are high temperature, formable dye inks.

7. A process according to claim 6 wherein said inks are selected from the group consisting of Naz-dar 9600, Colonial/Coates C-37 Series, Marabuwerke IMD Spezialfarbe 3060 and Nor-cote (UK) IMD Series inks.

8. A process according to claim 1 wherein said resin is selected from the group consisting of polycarbonates and polycarbonate-containing resins.

9. A process according to claim 1 wherein said gates are selected from the group consisting of fan gates and submarine gates that enter the part via a rib.

10. An improved second surface in-mold decorating process of encapsulating a decorated surface between an outer and an inner surface comprising the steps of:
    (1) starting with a smooth, transparent substrate;
    (2) decorating ink graphics onto the second surface of the substrate;
    (3) forming the printed substrate;
    (4) providing a mold with at least two half sectins that form a mold cavity that has one surface that matches the shape of the formed substrate or dimensions of the unformed substrate;
    (5) trimming the substrate so that it fits inside the injection mold;
    (6) placing the decorated, formed, trimmed substrate between the at least two half sections of the mold; and
    (7) closing the mold and injecting a resin through one or more gates against the decoration on the second surface of the substrate wherein the decorated surface is encapsulated between the transparent substrate and the injected resin.

11. A process according to claim 10 wherein a weatherable fluoropolymer film is co-extruded with said transparent substrate or laminating thereto.

12. A process according to claim 11 wherein said fluoropolymer film is selected from the group consisting of polyvinyl fluorides and polyvinylidene fluorides.

13. A process according to claim 10 wherein said transparent substrate is a polycarbonate.

14. A process according to claim 10 wherein said decorating step is done by screenprinting.

15. A process according to claim 10 wherein said inks are high temperature, formable dye inks.

16. A process according to claim 15 wherein said inks are selected from the group consisting of Naz-dar 9600, Colonial/Coates C-37 Series, Marabuwerke IMD Spezialfarbe 3060 and Nor-cote (UK) IMD Series inks.

17. A process according to claim 10 wherein said resin is selected from the group consisting of polycarbonates and polycarbonate-containing resins.

18. A process according to claim 10 wherein said gates are selected from the group consisting of fan gates and submarine gates that enter the part via a rib.

* * * * *